Figure 1:
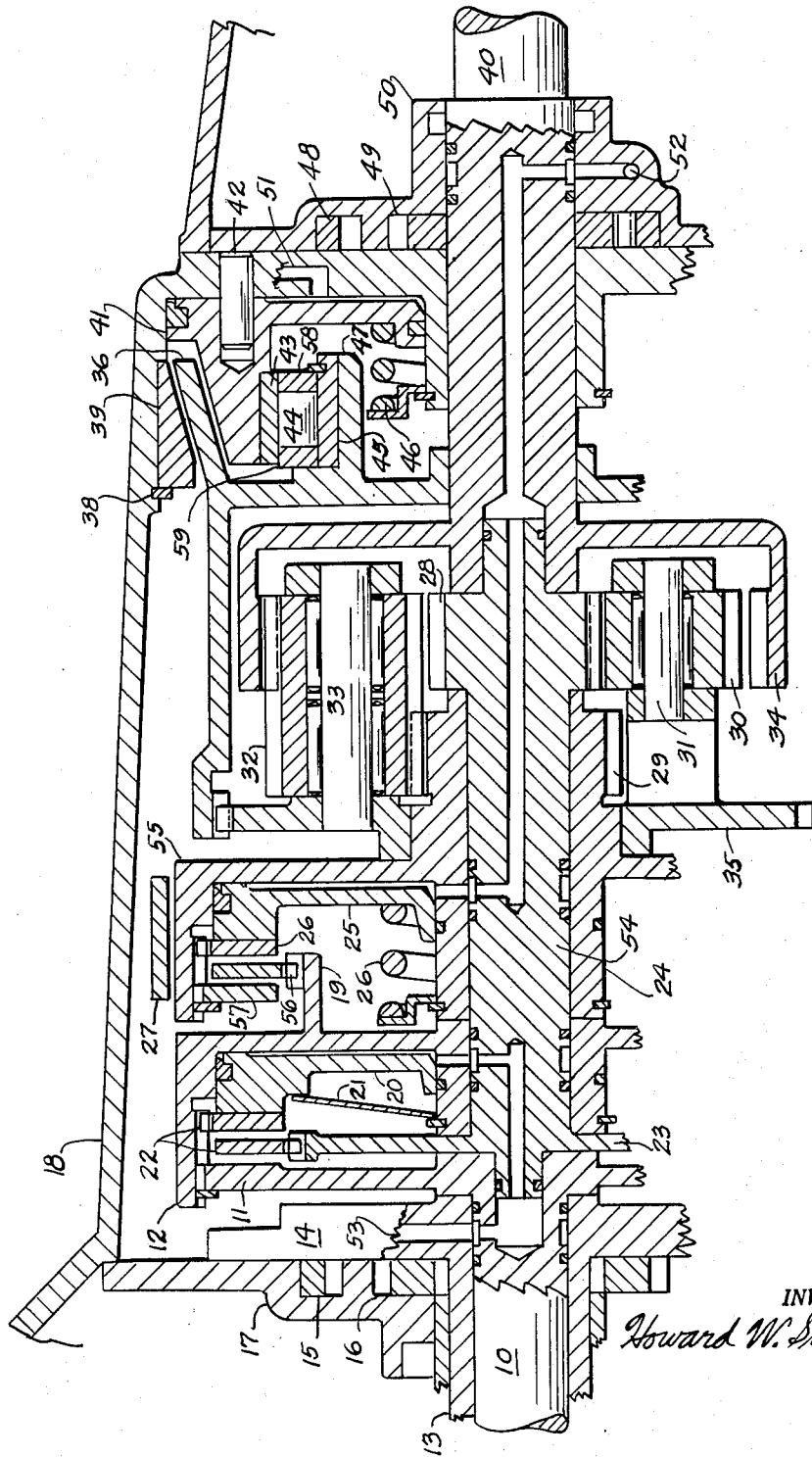

INVENTOR.
Howard W. Simpson.

2,953,946

COMBINATION ONE-WAY AND TWO-WAY BRAKE

Howard W. Simpson, 730 Crescent Drive,
Dearborn, Mich.

Filed Mar. 17, 1958, Ser. No. 721,819

5 Claims. (Cl. 74—762)

This invention refers to a dual mechanism for braking and holding a rotatable machine member against rotation. It is applicable to various devices including planetary transmissions.

The invention comprises a one-way brake of the sprag type, or optionally of the cam and roller type, together with a friction surface type two-way brake.

Previous to my invention separate and independent structure was required for each of these brakes, but in this invention the one-way brake is inside of the two-way brake and combined so that structure is common to both. Specifically the cylinder which applies the two-way brake also houses the one-way brake, and at the same time acts as structure through which the one-way brake can transmit its braking force to the stationary housing of the transmission.

The embodiment shown comprises a brake for holding a reaction member of panetary gearing against backward rotation when the gearing is driving in a forward reduction speed in a transmission having both forward and reverse reduction speeds. In such a unit a second speed can be obtained by holding a second reaction member. When this is done, in this embodiment, the reaction member of the previously engaged speed begins to turn forward. By having a one-way brake for the first speed reaction member, it will release automatically without requiring any other mechanism. Thus a very smooth shift from the first to second speed or visa versa is obtained. In the first speed the one-way brake will overrun upon reversal of torque and the vehicle will then free wheel.

The friction brake optionally prevents this and also provides a brake for use in reverse speed if, as in this embodiment, the same reaction member is used for both a forward and reverse reduction speed.

The object of the invention is to obtain a simple, compact and inexpensive combination dual brake.

Another object of the invention is to provide a predetermined timing of engagement of the two-way brake. This is described under Operation Fig. 1. In Fig. 1 input shaft 10 has flange 11 which is splined to clutch housing 12 and is supported in the hub 13 of plate 14. Hydraulic pump gears 15 and 16 are located in housing 17 which is attached to plate 14 and housing 18.

Clutch plates 22 are engaged by piston 20 by oil pressure through passage 53 to drive plate 23, shaft 54, and sun gear 28 at input shaft speed. Spring 21 releases clutch plates 22 when oil pressure is released.

Drum 19, being integral with housing 12, is driven at input speed and drives clutch plate 56. Oil under pressure through passage 52 moves piston 25 to engage clutch plates 26 and 56 against plate 57. This drives drum 55 and integral sun gear 29 at input speed. Spring 26 releases this clutch.

Brake band 27 engages drum 55 to hold sun gear 29 stationary and is actuated by a hydraulic servo not shown.

Planet gear 30 meshes with sun gear 28, and planet gear 32 meshes with sun gear 29 and ring gear 34. Planet gears 30 and 32 rotate on pins 31 and 33 respectively which are pressed into carrier 35 which is splined at its outer diameter to drive brake drum 36. Ring gear 34 is integral with output shaft 40.

Piston 41, located in housing 18, is free to move axially. Conical drum 36 can be engaged to hold the carrier 35 stationary when piston 41 is moved by oil pressure through passage 51 to hold drum 36 between conic piston 41 and conic ring 39, the latter being held in housing 18 by snap ring 38. One end of drum 36 is splined to engage the splines of carrier 35 which permits drum 36 to slide axially on carrier 35 to permit drum 36 to engage ring 39. An inner bore of piston 41 has a raceway 43 fixed in place and an inner raceway 45 is fixed to the hub 47 of drum 36.

One-way brake element 44 is biased between raceways 43 and 45 and permits only forward rotation of drum 36. Piston 41 is slideable on pin 42 which prevents rotation of raceway 43 and piston 41 either forward or backward.

Spring 46 returns piston 41 when oil pressure is released. Pump gears 48 and 49 are driven by output shaft 40 and are held in housing 50 which is fixed to the end of housing 18.

Guide rings 58 and 59 hold raceways 43 and 45 concentric to insure proper operation of one-way brake 44.

*Operation Fig. 1*

In a forward reduction speed, clutch plates 22 are engaged and sun gear 28 is driven at input speed. Brake drum 36 remains released. The reaction of ring gear 34 tends to turn carrier 35 backward, but this is prevented by one-way brake 44 which transmits the reactive force through raceway 43, piston 41, and pin 42 to fixed housing 18.

When changing to a second forward speed, brake band 27 is engaged which holds sun gear 29 stationary. Carrier 35 then is released automatically by one-way brake 44 and turns forward.

If free wheeling is to be avoided in the first speed, piston 41 is energized to engage drum 36 against ring 39. This prevents forward rotation of carrier 35. In reverse speed clutch plates 26 and 56 are engaged and sun gear 29 is driven at input speed. This tends to turn carrier 35 forward. Consequently one-way brake 44 is ineffective and conical piston 41 must be moved to hold drum 36 against ring 39 to hold carrier 35. Brake drum 36 is free to move axially in either direction since it is slideably splined at its forward or left hand end to carrier 35. Piston 41 can also move axially in relation to brake drum 36 in which case raceway 43 slides axially in either direction on one-way brake 44 and guide rings 58 and 59, while the piston itself slides on pins 42.

Taking up clearance between brake drum 36 and ring 39 and also between brake drum 36 and piston 41 requires axial movement of both the hydraulic piston 41 and brake drum 36, both in relation to transmission housing 18 and also in relation to each other. When torque loaded, friction of the brake drum 36, one-way brake 44 and pins 42 resists this movement and thus opposes the application of the two-way brake, but when torque is removed, as for instance by a momentary reversal of torque, full engagement of the two-way brake is no longer opposed.

This permits automatic timing of the application of the two-way brake. Thus the hydraulic valving system may be arranged to preload piston 41 by means of pressure through passage 51, but actual engagement of the two-way brake will not take place until torque on one-way brake 44 is relieved.

For instance, when rocking a vehicle forward and backward, overlapping of forward and reverse valve openings can be indulged in without danger of both the forward and reverse speeds being engaged simultaneously.

I claim:

1. A brake for retarding the rotation of a rotatable member and holding it stationary, said brake comprising a rotatable brake member, friction means for holding said brake member, a hydraulically operated movable non-rotatable piston for applying said friction means, means for holding said piston against rotation, a cylinder containing said piston, an opening into said cylinder for admitting fluid for exerting pressure on said piston, and a one-way brake element between said rotatable brake member and said piston.

2. In a variable speed transmission, planetary gearing, a reaction member, a one-way brake for holding the reaction member, a two-way brake for holding said reaction member, an axially movable member for applying said two-way brake, a housing for said axially movable member, said one-way brake being located between said reaction member and said axially movable member, and means for holding said axially movable member against rotation.

3. The combination set forth in claim 2, said axially movable member being hydraulically operated.

4. In a planetary gear transmission, a housing, input and output shafts, a reaction member, a one-way brake for holding said reaction member against backward rotation, a two-way brake for holding said reaction member against rotation in both directions, a piston for applying said two-way brake, means for holding the piston against rotation, a cylinder containing said piston, said one-way brake being located between said piston and said reaction member.

5. In a power transmission, planetary gearing having input and output members and a reaction member, a brake drum connected at one end to said reaction member, friction brake means adapted to hold the brake drum at its other end, a piston for applying said brake means, a stationary hydraulic cylinder for said piston and means for holding said piston against rotation in the cylinder, and a one-way brake located between said brake drum and said piston to prevent backward rotation of said brake drum.

References Cited in the file of this patent

UNITED STATES PATENTS

| | | |
|---|---|---|
| 2,332,061 | Conkle | Oct. 19, 1943 |
| 2,683,997 | Forster | July 20, 1954 |